United States Patent [19]

Terui et al.

[11] Patent Number: 4,464,037
[45] Date of Patent: Aug. 7, 1984

[54] MOTOR-DRIVEN CAMERA CAPABLE OF AUTOMATIC FOCUS CONTROL

[75] Inventors: Nobuhiko Terui; Nobuo Okabe, both of Tokyo, Japan

[73] Assignee: Nippon Kogaku K.K., Tokyo, Japan

[21] Appl. No.: 394,665

[22] Filed: Jul. 2, 1982

[30] Foreign Application Priority Data

Jul. 8, 1981 [JP] Japan .............................. 56-106609

[51] Int. Cl.³ .......................... G03B 3/10; G03B 17/38
[52] U.S. Cl. ...................................... 354/400; 354/266
[58] Field of Search ................. 354/25 R, 25 A, 25 P, 354/25 N, 173, 195, 268, 266, 400–409, 171.1, 174.11, 195.1; 352/140

[56] References Cited

U.S. PATENT DOCUMENTS

| 3,532,045 | 10/1970 | Genahr et al. | 354/25 |
| 4,093,365 | 6/1978 | Isono | 352/140 |
| 4,227,790 | 10/1980 | Shenk | 354/25 X |
| 4,371,240 | 2/1983 | Shimizu et al. | 352/140 |

Primary Examiner—William B. Perkey
Attorney, Agent, or Firm—Shapiro and Shapiro

[57] ABSTRACT

A camera having alternately selectable shutter release priority and focus control priority modes of operation. In the shutter release priority mode, operation of an automatic focusing device is inhibited when the shutter is actuated, and the shutter may be released irrespective of whether the photographic image is in focus. In the focus control priority mode, the shutter cannot be released unless the image is in focus. When the camera is in the shutter release priority mode, photographs may be taken in rapid succession without regard for precise focusing.

6 Claims, 1 Drawing Figure

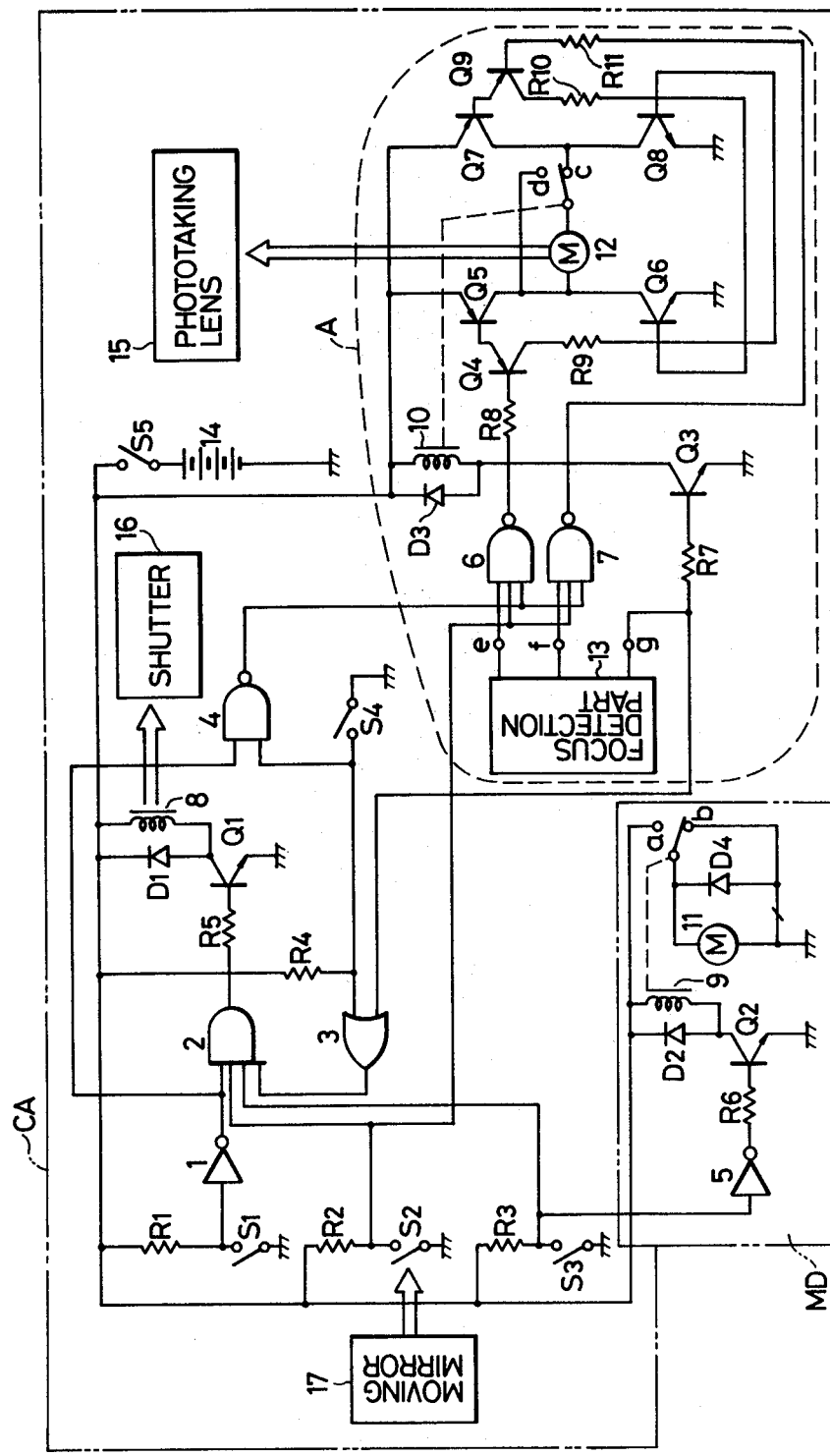

MOTOR-DRIVEN CAMERA CAPABLE OF AUTOMATIC FOCUS CONTROL

BACKGROUND OF THE INVENTION

1. Field of the Invention

The present invention relates to a motor-driven camera provided with an automatic focus controller.

2. Description of the Prior Art

In the art there is known such type of camera on which a motor-drive unit can be mounted to repeat film exposure and film take-up at definite time intervals. Also, such type of camera is known in which the focusing optical system of the phototaking lens can be driven by motor or the like for automatic focus control. Many attempts have been made to provide a camera having both of the functions for continuous photography by a motor-drive and for automatic focus control. However, since the continuous exposure operation by the motor-drive is performed in a predetermined sequence and at predetermined time intervals, it is difficult to accomodate the two different functions when they are incorporated into a single camera. Cameras hitherto proposed have a common drawback in that the automatic focus adjustment can not be completed within the time period of from the end of one exposure to the start of the next exposure and therefore the operation of the next exposure is stated early before the completion of the automatic focus control.

SUMMARY OF THE INVENTION

Accordingly it is an object of the invention to provide a camera in which automatic focus control is allowed before the start of a continuous picture taking operation but is inhibited after the start of the continuous picture taking operation, thereby allowing the taking of pictures at definite time intervals continuously.

It is another object of the invention to provide a camera which, when necessary, inhibits any exposure of film until the focusing by a focus controller is completed.

The camera of the present invention becomes particularly advantageous when it is wished to take as many pictures as possible in a short time rather than to carefully take a picture of an object while precisely focusing the lens on the object.

Other and further objects, features and advantages of the invention will appear more fully from the following description taken in connection with the accompanying drawing.

BRIEF DESCRIPTION OF THE DRAWING

The single FIGURE is a circuit diagram showing an embodiment of the invention.

DETAILED DESCRIPTION OF PREFERRED EMBODIMENT

In the circuit diagram shown in the drawing, CA is a circuit provided in the main body of a camera, MD is a circuit provided in a motor-drive mounted on the camera CA and A is a circuit of an automatic focus controller.

The circuit CA includes a release switch S1 interlocking with a release button (not shown). When the release button is pushed down, the release switch S1 is closed. When the push is removed from the button, the release switch S1 is opened. The release switch S1 is connected to ground GND on one side. On another side, it is connected to the connection point between a resistor R1 and the input of an inverter 1. The opening signal and closing signal of the release switch S1 appear at the output of the inverter 1 as a low level signal (Low) and a high level signal (High), respectively.

S2 is a mirror switch which is opened and closed in link with the motion of a moving mirror 17. The moving mirror 17 is provided to guide the light transmitted through a phototaking lens 15 to a finder optical system of the single-lens reflex camera. The mirror switch S2 is connected to GND on one side. On another side, it is connected to a junction point at which a resistor $R_2$, an input terminal of AND gate 2 and input terminals of NAND gates 6 and 7 are connected together. When the mirror is moved up to a position retracted from the photographing light path, a low signal (Low) is introduced into the input terminals of the above gates. When the mirror is moved down into the photographing light path, a high signal (High) is introduced into the input terminals of the above gates.

S3 is film take-up switch. It is connected to GND on one side. On another side, the take-up switch S3 is connected to a junction at which a resistor $R_3$, another input terminal of AND gate 2 and the input terminal of an inverter 5 are connected together. When an exposure of the film to light by a shutter 16 is completed, the switch S3 is closed in order to give a low level signal (Low) to the input terminals. When film take-up by one frame amount is completed by a film feed mechanism (not shown), the switch S3 is opened in response to it and a high level signal (High) is given to the input terminals. The film feed mechanism is driven by a motor 11. The motor 11 is started and stopped in the following manner:

When the input signal to the inverter 5 becomes Low, its output becomes High. Current is allowed to flow into the base of NPN transistor Q2. Thus, the transistor is rendered conductive and therefore the current flows into the coil of a relay 9 so that the contact of the relay 9 is changed over from b to a. Consequently, current is applied to the motor 11. The motor starts to drive the film feed mechanism for taking up the film. At the completion of film take-up in the amount of one frame, the input of the inverter 5 becomes High and therefore its output becomes Low. Thereby, NPN transistors Q2 is rendered non-conductive. The current flowing to the coil of the relay 9 is cut off and its contact is switched over from a to b, thereby short-circuiting the motor 11 and interrupting the current supply to the motor. At the same time, a dynamic brake is applied to the motor. Therefore, the motor stops rotating at once. In this manner, the operation of the motor 11 is controlled by the film take-up switch S3 through the inverter 5. Actuation or non-actuation of the motor is determined by closing or opening of the switch S3 which gives a Low or High signal to the input terminal of the inverter 5.

Designated by 13 is a focus detection part whose function is to detect wheter or not the focal point of the phototaking lens 15 is correctly adjusted to the object appearing at the center of a finder screen (not shown). As is well known, the focus detection part 13 detects the focusing condition of the image relative to a predetermined film plane. The focus detection part 13 has three output terminals e, f and g. The signal from the first output terminal e is High only when the lens 15 is in front focus. At all other times, the signal is Low. The second output terminal f produces a High signal only when the lens 15 is in rear focus. At all other times, the signal from the output terminal f is Low. The third output terminal g produces a High signal only when the lens 15 is in focus. At all other times, it produces a Low signal. The first and second output terminals e and f of the focus detection part 13 are connected to the respective first input terminals of NAND gates 6 and 7. In other words, so long as the remaining two inputs of NAND gate 6 are both High, the output of the gate 6 becomes Low when the lens 15 is in front focus and a High signal is produced from the terminal e of the focus detection part 13. When the lens 15 is in rear focus and a High signal is produced from the terminal f of the focus detector 13, the output of NAND gate 7 becomes Low so long as its other two inputs are both High at that time.

When the output of NAND gate 6 is Low, that is, when the lens 15 is in front focus, current flows to the bases of PNP transistors Q4 and Q5 through a resistor R8. Thereby the transistors Q4 and Q5 are rendered conductive to allow the current to flow into the base of NPN transistor Q8 through a resistor 9. Since the transistor Q8 is rendered conductive, now the current is applied to a focus adjusting motor 12 provided to move the focusing optical system of lens 15 in the direction of the optical axis. When current is supplied to the motor 12, it starts rotating in forward direction to move the lens 15 toward the position for in-focus from the front-focus position. When the lens 15 reaches the in-focus position, the output signal from output terminal e of the focus detector 13 becomes Low and therefore the output signal from NAND gate 6 becomes High. This blocks the current flowing to the bases of PNP transistors Q4 and Q5 to render Q4 and Q5 non-conductive. Since PNP transistor Q4 is rendered non-conductive and no current is applied to the base of a transistor Q8, NPN transistor Q8 is also rendered non-conductive. Consequently, the current supply to the motor 12 is terminated.

As lens 15 is now in the in focus position for, the output signal from the terminal g of the focus detector 13 is High. Therefore, the current flows to the base of transistor Q3 through resistor R7. The transistor Q3 is rendered conductive to allow the current to flow into the coil of a relay 10. Thereby, the contact of the relay 10 is changed over from c to d to short-circuit the motor 12. At the same time, a dynamic brake is applied to the motor 12 to stop it at once. In this manner, lens 15 is moved to the in-focus position from the front-focus position.

When lens 15 is in rear focus, the output of NAND gate 7 is Low because the output signal from the output terminal f of the focus detector 13 is High at the time. Therefore, similarly to the above, PNP transistors Q9, Q7 and NPN transistor Q6 are all rendered conductive. Therefore, current flows to the motor 12 in the opposite direction to the above. The motor 12 starts rotating in the reverse direction to move lens 15 toward the in-focus position from the rear-focus position. When lens 15 reaches the in-focus position, the focus detection part 13 issues a High signal from the output terminal g. The contact of the relay 10 is switched over from c to d to stop the motor 12. In this manner, the phototaking lens can be driven to the in-focus position automatically according to the state of the output from the focus detection part 13.

The output terminal of NAND gate 4 is connected to the input terminals of NAND gates 6 and 7. When the output of NAND gate 4 is Low, the outputs of NAND gates 6 and 7 become High irrespective of the state of output signals from the terminals e and f of the focus detection part 13. The phototaking lens 15 can not be driven at the time. In other words, at this time, the focusing mechanism for the phototaking lens 15 is rendered inactive.

Connected to one input terminal of NAND gate 4 is a selection switch S4. Another input terminal of the gate 4 is connected to the output terminal of the inverter 1. By operation of the selection switch S4 shutter release priority mode or focus control priority mode can be selected. When the selection switch S4 is opened to select the shutter release priority mode, a high level signal is introduced into the one input terminal of NAND gate 4. At this time, if the output from the inverter 1 is Low, which means the shutter release button is not pushed down, then the output of NAND gate 4 becomes High. This allows lens 15 to be driven to the in-focus position. But, if the output from the inverter 1 is High, which means push-down of the release button, then the output of NAND gate 4 becomes Low. This inhibits lens 15 from being driven. In the release priority mode, therefore, automatic focusing can be executed only before the shutter release button is pushed down. After the shutter release button is pushed down, the focusing mechanism remains inactive irrespective of whether or not the phototaking lens is in focus.

When the selection switch S4 is closed to select the focus control priority mode, the input signal to NAND gate 4 is Low. The output of NAND gate 4 is always High irrespective of the state of the signal to another input of the gate 4. This means that in this mode the focusing mechanism is always active irrespective of whether or not the shutter release button is pushed down.

One input terminal of OR gate 3 is connected to the junction of the one side of selection switch S4 and resistor R4. Another input terminal of OR gate 4 is connected to the output terminal g of the focus detector 13. When the selection switch S4 is open, the one input of OR gate 3 is connected to the above junction is High and the output of the gate 3 is always High irrespective of the state of the input signal to another input terminal of the gate. The output terminal of OR gate 3 is connected to one input terminal of AND gate 2. In this case, the output of AND gate 2 is determined by on the state of the remaining three inputs of the gate.

When the selection switch S4 is in its closed position, the signal to one input terminal of OR gate 3 is Low. Another input terminal of the gate 3 is connected to the output terminal g of the focus detector 13. The output of OR gate 3 becomes High only when the one input connected to the mode selection switch S4 is Low and the other input connected to the terminal g is High, which means that lens 15 is in focus. The state of the output signal from AND gate 2 is determined by the state of the remaining three input signals to the gate 4. When the phototaking lens is out of focus, the output of OR gate 3 is Low, and the output of AND gate 2 is Low irrespective of the state of the remaining three input signals to it.

In the release priority mode, the input signal applied to AND gate 2 from OR gate 3 is always High. However, the output of AND gate 2 becomes High only when the remaining three input signals to it are all High, that is, only when the release button has been pushed down, the mirror has been moved down and the film take-up has been completed. It is to be noted that in this mode the output of AND gate 2 is independent of the signal from the output terminal g of the focus detector 13 designating that lens 15 is in focus.

The High output signal from AND gate 2 is applied to the base of transistor Q1 through resistor R5 to render Q1 conductive. Therefore, current is applied to the electromagnetic release coil 8 to release the shutter 16. In this manner, when the shutter release priority mode is selected, the shutter releasing can be performed irrespective of whether or not the lens 15 is in the in-focus position.

D1 is a diode provided to prevent inverse voltage to the shutter release coil 8.

When the focus control priority mode is selected, the selection switch S4 is closed. Therefore, the output of OR gate 3 becomes High only when the signal from the output terminal g of the focus detector 13 is High, which means that lens 15 is in focus. In this state, the release of the shutter 16 can be performed in the same manner as above by pushing the release button down. However, if lens 15 is not in focus, exposure can not be performed even when the shutter release button is pushed down.

The manner of operation of the above apparatus is given as follows:

For the sake of explanation it is assumed that the mode selection switch S4 is now in its opened position to select the shutter release priority mode. At first, the photographer closes the power source switch S5 to bring the circuit into operation. The photographer directs the camera to the object. If the object is in front focus, the focus detector 13 will issue a signal from its output terminal e. If the object is in rear focus, then the focus detector 13 will issue a signal from its output terminal f. In any case, the motor 12 is driven by means of the output signal from the focus detector 13 to move the phototaking lens 15 to the in-focus position before the release button is pushed down. After visually ascertaining that lens 15 is in the in-focus position, the photographer pushes the release button down. Thereby, the release switch S1 is closed and the output of the inverter 1 becomes High. As the swtich S4 is open, the mirror is down (S2 open) and the film wind-up is not in progress (S3 open), all of the input signals to AND gate 2 are High. Consequently, the outut of AND gate 2 becomes High. Current flows to the base of NPN transistor Q1 through resistor R5 so that the transistor Q1 is rendered conductive. Since the transistor Q1 is conductive, the current is allowed to flow into the electromagnetic release coil 8 to release the shutter. Interlocking with the shutter release, the mirror is unlocked. The mirror moves up. The opening blade of the shutter is unlocked and it starts running. With the mirror up, the mirror switch S2 is closed and a low input signal is applied to NAND gates 6 and 7. If the photographer takes his finger from the release button at once, the output of the inverter 1 becomes Low and the output of NAND gate 4 becomes High. However, even in this state of the output signals from the inverter 1 and NAND gate 4, the phototaking lens 15 can not be driven for focusing during the exposure because the input signal applied to NAND gates 6 and 7 from the mirror switch S2 is Low at that time.

When the output of AND gate 2 becomes Low by the application of Low to the input thereof, NPN transistor Q1 is rendered non-conductive to block the current flowing to the electromagnetic release coil 8. In other words, current is supplied to the coil 8 during the time only from the push-down of the release button to the lift-up of the mirror.

At a time point determined by the automatic exposure control circuit (not shown), the closing blade of the shutter starts running to terminate the exposure. Upon the completion of the exposure, the moving mirror 17 moves down, by which the mirror switch S2 is opened. At the same time, the film take-up switch S3 is closed to start the operation for taking up the film. As the mirror switch S2 is opened with the mirror down, the input to NAND gates 6 and 7 becomes High. However, if the photographer continues pushing the release button, for continuous picture taking, the release switch S1 remains closed. The output of the inverter 1 is High and that of NAND gate 4 is Low at the time. Therefore, the outputs of NAND gates 6 and 7 are both High. Consequently, lens 15 can no longer be driven for focusing.

With the closing of the film take-up switch S3, the output of the inverter 5 becomes High and NPN transistor Q2 is rendered conductive. The current is allowed to flow into the coil of the relay 9. Thereby, the contact of the relay is changed over from b to a. The motor 11 starts rotating to take up the film. Upon the completion of the film take-up, the switch S3 is opened and the input of the inverter 5 becomes High. Thereby the transistor Q2 is rendered non-conductive to block the current flowing to the coil of the relay 9. Therefore, the contact of the relay is switched over from a to b so as to short-circuit the motor. Also, a brake is applied to the motor. Thus, the motor 11 stops at once.

The opening of the film take-up switch S3 also changes the state of the input of AND gate 2 to High. At the time, the mirror switch S2 is in its opened position because the mirror has already moved down. Therefore, the state of another input of AND gate 2 is also High. Consequently, if the photographer still continues pushing the releasing button to keep the release switch S1 closed, then the inverter 1 applies a high level signal to AND gate 2 which has, therefore, a High output. Thereby, current is allowed to flow into the shutter release coil 8. Thus, the shutter is again released. In this manner, when the release priority mode is selected by the selection switch S4 (in this case, the selection switch S4 is open), the output of NAND gate 4 always remains Low so long as the photographer continues pushing the release button. Driving of the phototaking lens 15 is inhibited. The shutter releasing can be performed continuously after the end of each film take-up irrespective of whether or not lens 15 is in the in-focus position.

When the focus control priority mode is selected, the selection switch S4 is closed.

In the focus control priority mode, the apparatus operates in the following manner:

By the photographer's pushing down the release button, the release switch S1 is closed. When lens 15 is in focus, current is allowed to flow into the electromagnetic coil 8 to perform an exposure operation. With the mirror up, the mirror switch S2 is closed and the current flowing to the release coil 8 is cut off in the same manner as above.

After the completion of the exposure, the mirror moves down and the mirror switch S2 is opened. The switch S3 is closed to take up the film. With the opening of the mirror switch S2, a High signal is applied to NAND gates 6 and 7. As the selection switch S4 is in its closed position, the input of NAND gate 4 is Low and its output is High. Therefore, NAND gate 4 also applies a High signal to NAND gates 6 and 7. Thus, each of NAND gates 6 and 7 is High at two of its three inputs, the remaining one of which is connected to the output terminal e or f of the focus detector 13. In this High state of the inputs to NAND gates 6 and 7, lens 15 can be driven for focusing after the above exposure. Assuming that after the above exposure, the object has moved a little in the direction away from lens 15 or the direction toward the lens 15, the lens 15 is now in front focus or in rear focus relative to the object. Therefore, the output signal from the terminal g of the focus detector 13 is Low, which is applied to one input of OR gate 3. The input signal applied to the other input terminal of OR gate 3 is also Low because the selection switch S4 being closed at this time. Since both of the two inputs of OR gate 3 are Low, its output is also Low which, is applied to one of the four inputs of AND gate 2. Therefore, the next exposure operation can not be started at once after the completion of film take-up accompanied by the opening of the switch S3. This is compared with the above described operation of the apparatus in the shutter release priority mode wherein the next exposure can be performed at once after the film take-up is completed and the switch S3 is opened. In contrast, in the case of the focus control priority mode now being discussed, the next exposure can not be performed at once even when the photographer continues pushing the release button after the mirror is down and the completion of film take-up. The reason for this is that one of the inputs of AND gate 2 is Low and therefore its output can not become High.

After being driven some distance for focusing, the phototaking lens 15 reaches the in-focus position. At this moment, the signal from the output terminal g of the focus detection part 13 changes to High. Therefore, one input of OR gate 3 becomes High and its output now becomes High which is applied to AND gate 2. Consequently, the output of AND gate 2 is rendered High to allow the next exposure. Therefore, if the photographer is still pushing the release button at this time, the exposure is performed with the taking lens has just get in the in-focus position.

In this manner, when the selection switch S4 is closed, one exposure and the next exposure can not continuously be carried out unless lens 15 is in focus. The next exposure is performed only when the previously exposed frame of film has been taken up and lens 15 has been moved to the in-focus position. In other words, in the case of the focus control priority mode, the next shutter release is never done before the completion of the focus adjustment for the next exposure. On the contrary, in the shutter release priority mode, the next shutter release can be done even when the phototaking lens is out of focus relative to the object, for example, in the case of continuous picture taking of a moving object.

While the present invention has been particularly shown and described with reference to an embodiment wherein the motor-driven camera is composed of the main body of a camera CA and a motor-drive unit MD detachably mounted thereon, it is to be understood that the motor-driven camera according to the invention may be formed as a camera having a built-in motor-drive unit in which the motor drive-unit MD is fixedly mounted in the main body of camera CA.

We claim:

1. In a camera having means for forming an image of an object on a predetermined plane; focus detection means for detecting the focusing condition of said image relative to said plane; focus adjusting means for adjusting said image forming means depending on said detecting so as to obtain an in-focus condition of said image on said plane, said focus detection means producing an in-focus signal when said image is in focus on said plane; and means for exposure of film in response to a shutter releasing operation, the improvement comprising:
   means for stopping operation of said focus adjusting means prior to said exposure and until the completion of said exposure;
   control means having a first control mode in which said stopping means and said exposure means are brought into operation in response to the shutter releasing operation and a second control mode in which said stopping means and said exposure means are brought into operation at the shutter release operation in response to said in-focus signal; and
   means for changing over the control mode between said first and second modes.

2. Camera as set forth in claim 1, wherein said focus adjusting means includes an electric motor for said adjustment and wherein said stopping means includes means for short-circuiting said electric motor.

3. A camera having means for forming an image of an object on a predetermined plane and means for exposure of film in response to a shutter releasing operation, comprising:
   (a) detecting means for detecting the focusing condition of said image relative to said predetermined place, said detecting means producing an in-focus signal when said image is in focus on said predetermined plane;
   (b) adjusting means for adjusting said image forming means depending on said detecting so as to obtain the in-focus condition of said image on said predetermined plane;
   (c) means for stopping said adjusting means prior to said exposure and until the completion of said exposure;
   (d) control means having a first control mode in which said stopping means and said exposure means are brought into operation in response to the shutter releasing operation and a second control mode in which said stopping means and said exposure means are brought into operation at the shutter release operation in response to said in-focus signal; and
   (e) means for changing over the control mode between said first and second modes.

4. A camera as set forth in claim 3, wherein said adjusting means includes an electric motor for adjusting said image forming means and wherein said stopping means includes means for short-circuiting said electric motor.

5. In a camera having a photographic lens, a shutter, shutter release means operative to produce a shutter release signal, and an automatic focusing device for focusing said lens, the improvement comprising apparatus for providing, alternately, a shutter release priority operating mode and a focus control priority operating mode, said apparatus including means operative in said shutter release priority operating mode for inhibiting the operation of said automatic focusing device in response to said shutter release signal, and means operative in said focus control priority operating mode for inhibiting actuation of said shutter until said automatic focusing device has operated to focus said lens, and means for selecting said operating modes alternately.

6. A camera in accordance with claim 5, wherein said camera includes continuous operation means for causing continuous operation of said camera to take successive photographs in response to continuation of said shutter release signal, and wherein, in said shutter release priority operating mode, said inhibiting means inhibits operation of said automatic focusing device until termination of said continuous operation.

* * * * *